United States Patent
Taylor et al.

(10) Patent No.: US 11,736,311 B2
(45) Date of Patent: *Aug. 22, 2023

(54) GATEWAY FOR TRANSPORTING OUT-OF-BAND MESSAGING SIGNALS

(71) Applicant: Comcast Cable Communications, LLC, Philadelphia, PA (US)

(72) Inventors: Kevin N. Taylor, Parker, CO (US); Doug Jones, Boulder, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/589,489

(22) Filed: Jan. 31, 2022

(65) Prior Publication Data

US 2022/0231876 A1 Jul. 21, 2022

Related U.S. Application Data

(63) Continuation of application No. 14/988,460, filed on Jan. 5, 2016, now Pat. No. 11,271,867, which is a
(Continued)

(51) Int. Cl.
| | |
|---|---|
| *H04L 12/28* | (2006.01) |
| *H04N 21/61* | (2011.01) |
| *H04N 21/643* | (2011.01) |
| *H04N 21/4227* | (2011.01) |
| *H04L 67/125* | (2022.01) |

(Continued)

(52) U.S. Cl.
CPC ...... *H04L 12/2801* (2013.01); *H04L 12/2856* (2013.01); *H04L 12/2872* (2013.01); *H04L 47/825* (2013.01); *H04L 49/30* (2013.01); *H04L 61/2592* (2013.01); *H04L 61/5014* (2022.05); *H04L 67/125* (2013.01); *H04L 67/303* (2013.01); *H04N 7/17318* (2013.01); *H04N 21/4227* (2013.01); *H04N 21/6106* (2013.01); *H04N 21/6118* (2013.01); *H04N 21/6168* (2013.01); *H04N 21/64322* (2013.01); *H04L 12/2803* (2013.01); *H04L 12/2838* (2013.01); *H04L 2012/2849* (2013.01)

(58) Field of Classification Search
CPC . H04L 12/2801; H04L 12/2872; H04L 67/34; H04L 61/5014; H04L 67/303; H04L 47/825; H04L 12/2885; H04N 7/17318; H04N 12/2885
See application file for complete search history.

(56) References Cited

U.S. PATENT DOCUMENTS

| | | |
|---|---|---|
| 5,745,837 A | 4/1998 | Fuhrmann |
| 5,926,104 A | 7/1999 | Robinson |

(Continued)

OTHER PUBLICATIONS

NPL search history (Year: 2023).*
(Continued)

*Primary Examiner* — Anez C Ebrahim
(74) *Attorney, Agent, or Firm* — Banner & Witcoff, Ltd.

(57) ABSTRACT

A Cable Modem Termination System (CMTS) having a gateway configured to output signals on over data tunnels for transfer over a cable network to Customer Premises Equipment (CPE). Each data tunnel is preferably characterized as a one-way data stream of out-of-band (OOB) messaging signals.

21 Claims, 3 Drawing Sheets

Related U.S. Application Data continuation of application No. 12/970,364, filed on Dec. 16, 2010, now Pat. No. 9,264,250, which is a continuation of application No. 10/570,830, filed as application No. PCT/US2004/028909 on Sep. 7, 2004, now Pat. No. 7,961,742.

(60) Provisional application No. 60/501,231, filed on Sep. 5, 2003.

(51) Int. Cl.
| | |
|---|---|
| *H04L 67/303* | (2022.01) |
| *H04L 47/70* | (2022.01) |
| *H04L 49/00* | (2022.01) |
| *H04L 61/2592* | (2022.01) |
| *H04N 7/173* | (2011.01) |
| *H04L 61/5014* | (2022.01) |

(56) References Cited

U.S. PATENT DOCUMENTS

| | | | |
|---|---|---|---|
| 6,018,625 | A | 1/2000 | Hayball et al. |
| 6,073,172 | A | 6/2000 | Frailong et al. |
| 6,084,876 | A | 7/2000 | Kwok et al. |
| 6,473,863 | B1 | 10/2002 | Genty et al. |
| 6,487,594 | B1 | 11/2002 | Bahlmann |
| 6,523,696 | B1 | 2/2003 | Saito et al. |
| 6,614,781 | B1 | 9/2003 | Elliott et al. |
| 6,674,749 | B1 | 1/2004 | Mattathil |
| 6,681,232 | B1 | 1/2004 | Sistanizadeh et al. |
| 6,804,708 | B1 | 10/2004 | Jerding et al. |
| 6,853,680 | B1 | 2/2005 | Nikolich |
| 6,857,009 | B1 | 2/2005 | Ferreria et al. |
| 6,952,836 | B1 | 10/2005 | Donlan et al. |
| 6,988,130 | B2 | 1/2006 | Blumenau et al. |
| 7,003,481 | B2 | 2/2006 | Banka et al. |
| 7,068,597 | B1 | 6/2006 | Fijolek et al. |
| 7,075,899 | B2 | 7/2006 | Sheehan et al. |
| 7,080,400 | B1 | 7/2006 | Navar |
| 7,107,326 | B1 | 9/2006 | Fijolek et al. |
| 7,134,131 | B1 | 11/2006 | Hendricks et al. |
| 7,194,756 | B2 | 3/2007 | Addington et al. |
| 7,200,144 | B2 | 4/2007 | Terrell et al. |
| 7,219,124 | B2 | 5/2007 | Cerami et al. |
| 7,287,257 | B2 | 10/2007 | Meza |
| 7,292,582 | B2 | 11/2007 | Kimber et al. |
| 7,293,282 | B2 | 11/2007 | Danforth et al. |
| 7,313,610 | B2 | 12/2007 | Held et al. |
| 7,324,515 | B1 * | 1/2008 | Chapman ............ H04L 12/4633 370/392 |
| 7,349,430 | B1 | 3/2008 | Chapman |
| 7,359,434 | B2 | 4/2008 | Shahar et al. |
| 7,509,425 | B1 | 3/2009 | Rosenberg |
| 7,720,960 | B2 | 5/2010 | Pruss et al. |
| 7,725,029 | B1 | 5/2010 | Bernier et al. |
| 7,757,261 | B2 | 7/2010 | Addington et al. |
| 7,987,228 | B2 | 7/2011 | McKeown et al. |
| 8,543,681 | B2 | 9/2013 | Bearden et al. |
| 8,839,220 | B2 | 9/2014 | Carter et al. |
| 9,077,760 | B2 | 7/2015 | McKeown et al. |
| 9,087,319 | B2 | 7/2015 | Nguyen |
| 2001/0033585 | A1 | 10/2001 | Lazarus et al. |
| 2001/0056350 | A1 | 12/2001 | Calderone et al. |
| 2002/0001316 | A1 | 1/2002 | Hornsby et al. |
| 2002/0012353 | A1 | 1/2002 | Gerszberg et al. |
| 2002/0019984 | A1 | 2/2002 | Rakib |
| 2002/0065907 | A1 | 5/2002 | Cloonan et al. |
| 2002/0067725 | A1 | 6/2002 | Oguchi et al. |
| 2002/0071440 | A1 | 6/2002 | Cerami et al. |
| 2002/0097728 | A1 | 7/2002 | Hinderks et al. |
| 2002/0141365 | A1 | 10/2002 | Leung |
| 2002/0143565 | A1 | 10/2002 | Headings et al. |
| 2002/0191635 | A1 | 12/2002 | Chow et al. |
| 2003/0033612 | A1 | 2/2003 | Schwalb |
| 2003/0048380 | A1 | 3/2003 | Tamura |
| 2003/0120819 | A1 | 6/2003 | Abramson et al. |
| 2003/0191848 | A1 | 10/2003 | Hesselink et al. |
| 2003/0196204 | A1 | 10/2003 | Thiagarajan et al. |
| 2003/0200548 | A1 | 10/2003 | Baran et al. |
| 2003/0208695 | A1 | 11/2003 | Soto et al. |
| 2004/0001433 | A1 | 1/2004 | Gram et al. |
| 2004/0030804 | A1 | 2/2004 | Wiget et al. |
| 2004/0073912 | A1 | 4/2004 | Meza |
| 2004/0088737 | A1 | 5/2004 | Donlan et al. |
| 2004/0107284 | A1 | 6/2004 | Koperda et al. |
| 2004/0133793 | A1 | 7/2004 | Ginter et al. |
| 2004/0141759 | A1 | 7/2004 | Stiscia et al. |
| 2004/0158618 | A1 | 8/2004 | Shaw |
| 2004/0177133 | A1 | 9/2004 | Harrison et al. |
| 2004/0181811 | A1 | 9/2004 | Rakib |
| 2004/0203630 | A1 | 10/2004 | Wang |
| 2004/0210450 | A1 | 10/2004 | Atencio et al. |
| 2004/0261114 | A1 | 12/2004 | Addington et al. |
| 2004/0261126 | A1 | 12/2004 | Addington et al. |
| 2005/0177861 | A1 | 8/2005 | Ma et al. |
| 2005/0228877 | A1 | 10/2005 | Monitzer et al. |
| 2005/0265398 | A1 | 12/2005 | Chapman et al. |
| 2006/0059107 | A1 | 3/2006 | Elmore et al. |
| 2006/0095945 | A1 | 5/2006 | Carpenter et al. |
| 2008/0002669 | A1 | 1/2008 | O'Brien et al. |
| 2008/0010300 | A1 | 1/2008 | Bunn et al. |

OTHER PUBLICATIONS

Office Action from Canadian Application No. 2,536, 177, dated Nov. 18, 2011.
International Search Report from PCT/US04/28908, dated Aug. 26, 2005.
International Search Report from PCT Application No. PCT/US04/28909, dated Apr. 11, 2005.
Response to Canadian Office Action—CA 2,536,103—dated Mar. 25, 2015.
Canadian Office Action—CA Appl. 2,536,103—dated Dec. 11, 2015.

* cited by examiner

GATEWAY FOR TRANSPORTING OUT-OF-BAND MESSAGING SIGNALS

CROSS-REFERENCE TO RELATED APPLICATIONS

This application is a continuation of U.S. application Ser. No. 14/988,460 filed on Jan. 5, 2016, which is a continuation of U.S. application Ser. No. 12/970,364 filed on Dec. 16, 2010, now U.S. Pat. No. 9,264,250, which is a continuation of U.S. application Ser. No. 10/570,830 filed on Mar. 6, 2006, now U.S. Pat. No. 7,961,742, which is a National Stage Entry of International Application Serial No. PCT/US2004/028909 filed Sep. 7, 2004, which claims the benefit of U.S. provisional application Ser. No. 60/501,231 filed on Sep. 5, 2003.

FIELD OF THE INVENTION

The present invention relates to Cable Modem Termination Systems (CMTSs) of the type having a gateway for transporting out-of-band (OOB) messaging signals.

BACKGROUND OF THE INVENTION

A cable modem termination system (CMTS) is generally a system located at a headend or other location of a cable service provider for transporting data packets from one location to another, such as between an internet service provider (ISP) and a subscriber station. In particular, the CMTS may be configured for downstream communication such that it is configured to receive IP packets from the ISP, to convert the IP packets to digital cable packets, and to deliver the digital cable packets to the subscriber station. In addition, the CMTS may be configured for upstream communication such that it is configured to receive digital cable packets from the subscriber station, to convert the digital cable packets to IP packets, and to deliver the IP packets to the ISP.

A need exists for a CMTS to include capabilities for transporting OOB messaging signals.

SUMMARY OF THE INVENTION

The present invention contemplates a number of features and configurations for the CMTS, including the CMTS having a gateway configured to output signals on at least two types of data tunnels for transfer over a cable network to Customer Premises Equipment (CPE). Each data tunnel is preferably characterized as a one-way data stream of out-of-band (OOB) messaging signals and each type of data tunnel is preferably associated with a different type of OOB messaging signals such that different types of data tunnels transfer different types of OOB messages.

In one aspect of the present invention, the system includes a CMTS configured to include a gateway configured to output signals on a plurality of data tunnels for transfer over a cable network to Customer Premises Equipment (CPE). Each data tunnel is preferably characterized as a one-way data stream of out-of-band (OOB) messaging signals. The CMTS preferably includes a plurality of output ports for transferring the OOB messaging signals from the gateway to the cable network, wherein each output port is capable of transferring different types of OOB messaging signals.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
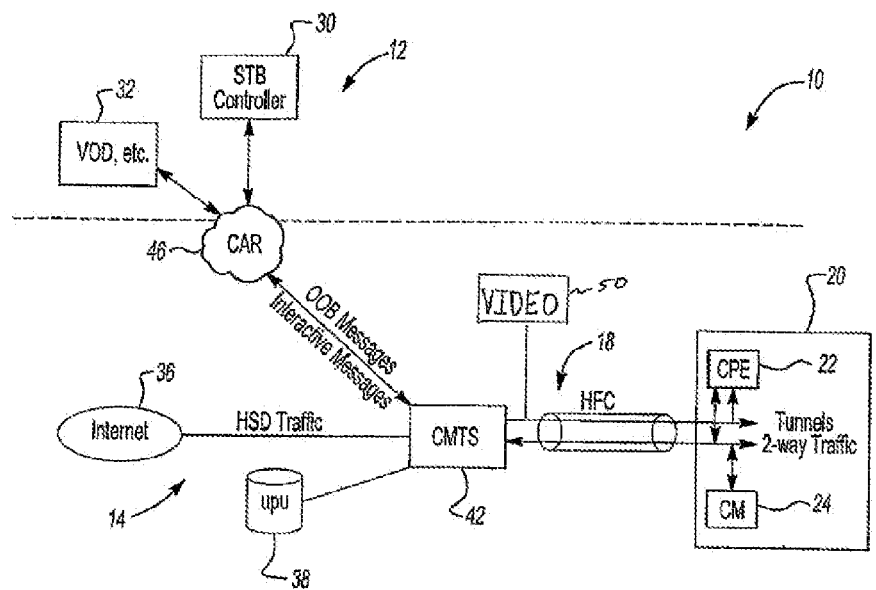
FIG. 1 illustrates a cable system in accordance with one aspect of the present invention.

FIG. 1 illustrates a cable system 10 in accordance with one aspect of the present invention. The system 10 includes a management network 12 and a High Speed Data (HSD) network 14 that respectively provide management and HSD services over a hybrid fiber coax (HFC) 18, or other communication medium, to a subscriber station 20, which includes Customer Premises Equipment (CPE) 22 and a cable modem (CM) 24.

The management network 12 generally comprises two portions, a control portion 30 and an application portion 32. The control portion 30 includes a settop box (STB) controller to control, provision, manage, and secure the CPE 22 through out-of-band (OOB) messaging. The application portion 32 provides applications to the CPE 22, such as video on demand (VOD), interactive television (iTV), and other services.

The HSD network 14 provides data services for the system 10, including services for the CM 24 to access the Internet 36. It includes a network provisioning unit (NPU) 38 having capabilities for Dynamic Host Configuration Protocol (DHCP), Trivial File Transfer Protocol (TFTP), and the like, in addition to a Domain Name System (DNS) server.

The system 10 includes a cable modem termination system (CMTS) 42 to send and receive signals to and from the CPE 22 and the CM 24 over the HFC 18. In general, the CMTS 42 transfers IP packets from the HSD network 14 and the management network 12 to the CPE 22 and CM 24 for processing. Preferably, the signals are outputted from the CMTS 42 on downstream output channels, which preferably include one-way output data tunnels, such as for OOB messaging. In addition, the CMTS 42 is configured to receive signals from the CPE 22 and the CM 24 to support two-way communication therewith, such as for transfer of IP packets from the CPE 22 and/or the CM 24 to the Internet 36 and/or the VOD or STB controller portions 32 and 30.

The system 10 includes a conditional access router (CAR) 46 to connect the management network 12 to the CMTS 42. The CAR 46 transports signals therebetween using IP protocols and provides firewall separation for the VOD or STB controller portions 32 and 30 from the HSD network 14, enhancing security from any devices attempting to associate with devices and signaling on the management network 12.

In operation, signaling traffic transported between the management network 12 and the CMTS 42 may be wrapped into addressable packets, such as Ethernet, IP, or other packets.

The system 10 includes a video unit 50 for delivering video signals to the subscriber station 20 over the HFC 18. The video unit 50 can deliver any number of video signals, including network television, cable television, pay-per-view, video on demand, and the like.

Figure 2:
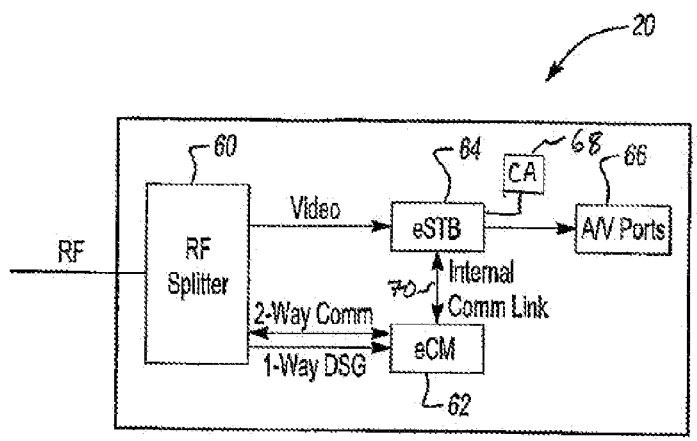
FIG. 2 illustrates Customer Premises Equipment (CPE) in accordance with one aspect of the present invention.

FIG. 2 illustrates the CPE 22 in accordance with one aspect of the present invention. The CPE 22 is preferably configured to communicate with the CMTS 42 through digital cable signals, such as through signaling defined by the Data Over Cable Service Interface Specification (DOCSIS) and/or through other protocols authorized through DHCP registration.

The CPE 22 includes a radio frequency (RF) splitter 60, an embedded cable modem (eCM) 62, an embedded set-top box (eSTB) 64, an audio visual (A/V) port 66, and an optional conditional access (CA) unit 68. The RF splitter 60 splits the RF signal into two portions—one for OOB control functions and two-way application traffic and one for video delivery. The OOB and two-way application traffic is relayed to the eCM 62 and the video is relayed to the eSTB 64.

The eSTB 64 outputs video and other media signals to a media output device (not shown) or other device connected to the A/V port 66, such as to a television (TV), digital video recorder (DVR), personal video recorder (PVR), or the like.

The eCM 62 processes control and other non-media signals, such as DOCSIS and other IP packets, and bridges or relays the signals to the eSTB 64 through an internal communications link 70. In particular, the communications link 70 is used to transfer data tunnels tuned to by the eCM 62 to the eSTB 64 so that OOB messaging signals can be delivered to the eSTB 64 for processing.

The CA unit 68 provides conditional access control for the subscriber station 20. It can be a CableCard, SmartCard, or other item for controlling security and access to the data, video, and control signals transmitted over the HFC 18. It is illustrated as a standalone item, however, it can be included with or embedded on the eSTB 64 or the eCM 62 to perform similar functions.

The eCM 62, eSTB 64, and CA unit 68 are logically separate entities, however, they may physically share hardware and software. Other items, such as control logic and applications may be included on the CPE 22 for controlling operation of the eSTB 64 and/or the eCM 62.

Figure 3:
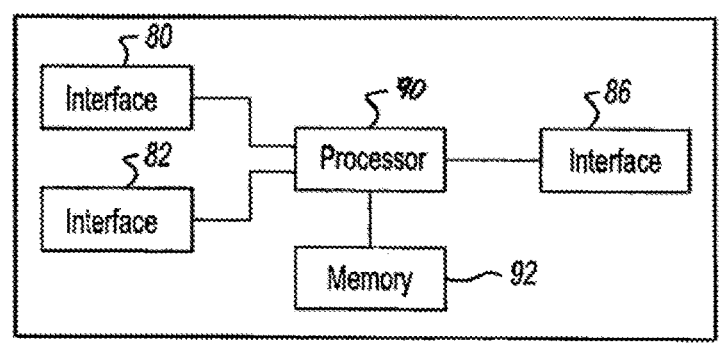
FIG. 3 illustrates a Cable Modem Termination System (CMTS) in accordance with one aspect of the present invention.

FIG. 3 illustrates the CMTS 42 in accordance with one aspect of the present invention. The CMTS 42 includes a first interface 80 and a second interface 82 for sending and receiving signals to and from the management and HSD networks 12, 14, respectively. The CMTS 42 further includes a third interface 86 for sending and receiving signals to and from the CPE 22 and CM 24 over the HFC 18. A processor 90, which is in communication with a memory 92, processes the signals for communication with the first, second, and third interfaces 80, 82, 86 according to instructions stored on the memory 92.

Figure 4:
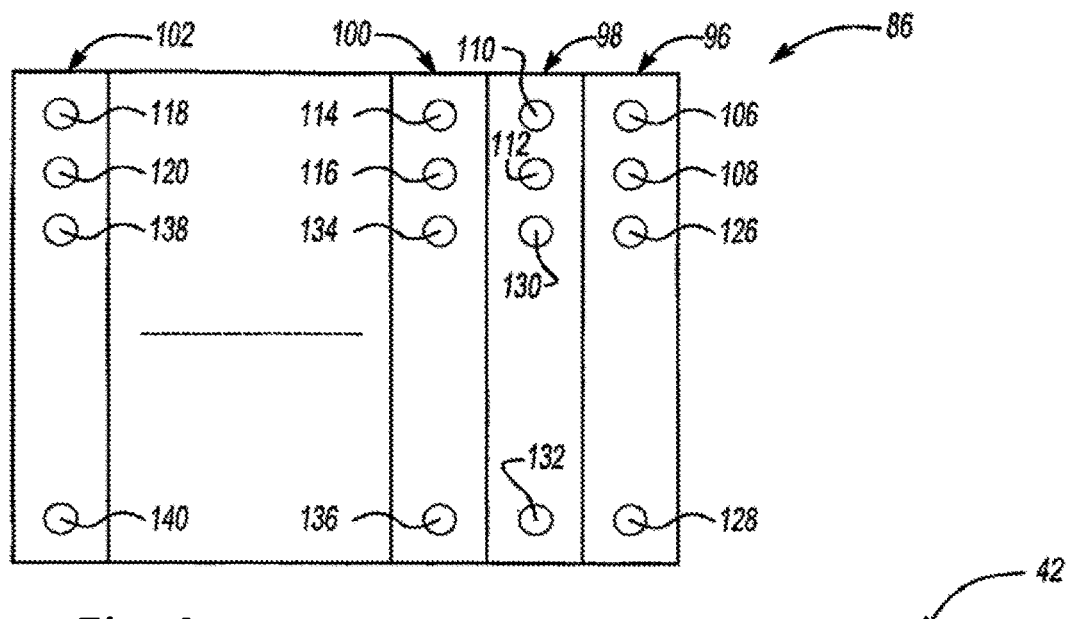
FIG. 4 illustrates an interface of the CMTS in accordance with one aspect of the present invention.

FIG. 4 illustrates the third interface 86 in accordance with one aspect of the present invention. The third interface 86 includes a number of blades, referred to with reference numerals 96-102, which each include a number of output ports, referred to with reference numerals 106-120, and a number input ports, referred to with reference numerals 126-140. The blades 96-102 may be removable items, such as cards. The input ports 126-140 receive signals from the CPE 22 and the CM 24 and the output ports 106-120 send signals to the CPE 22 and the CM 24. The ports 106-140 are preferably radio frequency (RF) ports. The third interface 86 can include any number of blades 96-102 and any number of input and output ports 106-140 without deviating from the scope and contemplation of the present invention.

The CMTS 42 may be configured to output and receive any number of data streams over the ports 106-140, including OOB messaging signals, HSD signals, management layer signals, video signals, and other signals. The CMTS 42 may be configured to support multiple data streams through time or frequency division multiplexed for delivery to the CPE 22 and CM 24. In this manner, multiple data streams may be included on the HFC 18 to facilitate communication with the CPE 22 and the CM 24. Each output port 106-120 is preferably separately configurable such that each output port may output different OOB messaging signals. In this manner, each blade 96-102 may include output ports having the same or different OOB messaging signals.

Figure 5:
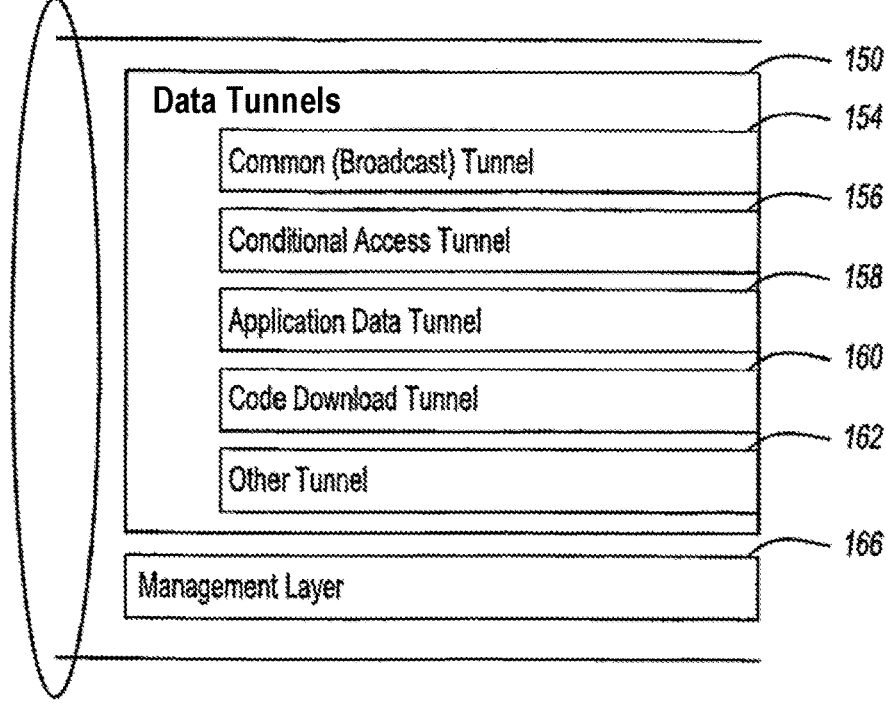
FIG. 5 illustrates a data tunnel in accordance with one aspect of the present invention.

FIG. 5 illustrates data outputted from one of the output ports 106 in accordance with one aspect of the present invention. Preferably, OOB messaging signals are outputted on data tunnels 150 that are one-way data streams and include instructions to provision, manage, and secure the CPE 22, and which are delivered from the CMTS 42 to the eCM 62 according to protocols defined in the DOCSIS. The OOB messaging signals may assigned to different tunnel types, such as a common broadcast tunnel type 154, a conditional access tunnel type 156, an application data tunnel type 158, a code download tunnel type 160, and an other tunnel type 162. The broadcast tunnel 154 may be used to communicate signals for multiple subscriber stations 20, such as Emergency Alert System (EAS) signals and other standardized messages. The conditional access tunnel 156 may be use to communicate entitlement management messages and the like. The application tunnel 158 may be used to communicate program guide data, such as for electronic programming guides (EPGs). The code download tunnel 160 may be used to deliver new operating codes and updates to the subscriber station 20.

Figure 6:
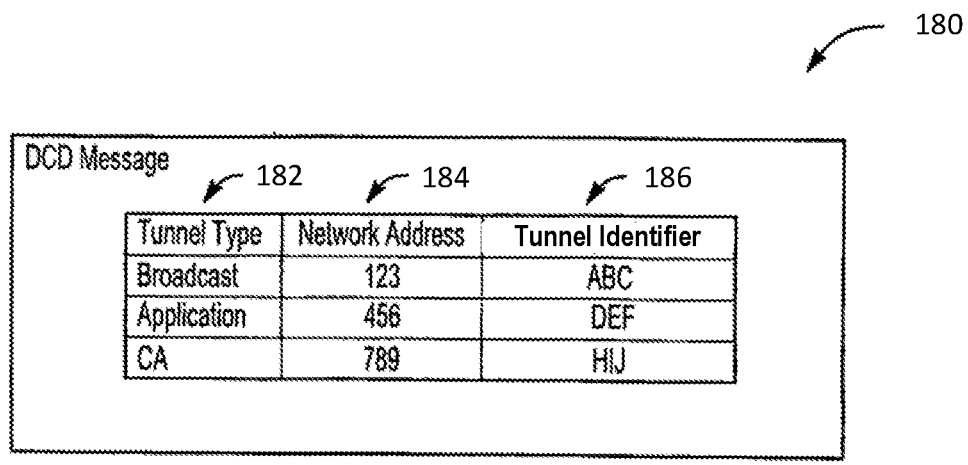
FIG. 6 illustrates a Downstream Channel Descriptor (DCD) message in accordance with one aspect of the present invention.

Referring to FIG. 6, each tunnel type 182 is preferably associated with a unique network address 184, such as a media access control access (MAC) address. The MAC address of each tunnel type 182 may be used by the CPE 22 or other downstream device to locate desired tunnels 154-162. A downstream channel descriptor (DCD) message 180, as shown in FIG. 6, may be outputted over a management layer data stream 166 (FIG. 5), which is preferably separate from the data tunnels 150, for mapping or associating the different tunnel types 182 with their network addresses 184 so that devices located downstream thereof may interpret the DCD message 180 to located desired tunnel types 182.

FIG. 6 illustrates a diagram of the DCD message 180 in accordance with one aspect of the present invention. The illustrated DCD message 180 is in a table format, however, the message 180 may have any form. It includes a tunnel type column 182, a network address column 184, and a tunnel identifier column 186. The tunnel type column 182 identifies the tunnel types of the tunnels identified in the DCD message 180. The network address 184 associated with the tunnel types 182 are shown in the network address column 184. Tunnel identifiers 186 associated with the network address 184 are shown in the tunnel identifier column 186. The tunnel identifiers 186 are unique identifiers associated with each tunnel type 182. The tunnel types 182 are common identifiers, i.e. broadcast, conditional access, application, etc, such that the same DCD message 180 or different DCD message 180 may include the same tunnel type. In contrast, the tunnel identifier 186 is a unique identifier for each tunnel 154-162, regardless of the tunnel type 182 assigned to the tunnel 154-162, such that the tunnel identifier 186 may be used to differentiate between different tunnels 1542-162 identified with the same tunnel type 182. For example, the CMTS 42 may be required to support CPEs 22 of different vendors such that each vendor requires a particular set of conditional access signals. In this case, the conditional access signals are provided through different conditional access tunnels 156, whereby each conditional access tunnel 156 is identifiable by the tunnel identifier 186 associate therewith. In this manner, multiple conditional access tunnels 156 may be used within the system 10 and assigned to different CA units 68 based on the unique tunnel identifier 186, which is preferably referred to as its conditional access identification.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. An apparatus comprising:
    one or more processors; and
    memory storing instructions that, when executed by the one or more processors, configure the apparatus to:
        send, to a computing device, at least one indication associating a plurality of different network addresses with a plurality of data tunnels of different types, wherein the at least one indication is sent via a data tunnel different from the plurality of data tunnels;
        send, via the plurality of data tunnels of the different types and to the computing device, a plurality of signals; and
        cause the computing device to process the at least one indication before processing the plurality of signals.

2. The apparatus of claim 1, wherein the instructions, when executed by the one or more processors, configure the apparatus to send the at least one indication by sending the at least one indication via a control data stream.

3. The apparatus of claim 1, wherein the different tunnel types comprise two or more of:
    a broadcast tunnel type;
    a code download tunnel type;
    a conditional access tunnel type; or
    an application tunnel type.

4. The apparatus of claim 1, wherein the instructions, when executed by the one or more processors, configure the apparatus to send the plurality of signals by sending the plurality of signals via a plurality of output ports.

5. The apparatus of claim 1, wherein the instructions, when executed by the one or more processors, configure the apparatus to send the at least one indication by sending:
    an association between a first network address and a first tunnel identifier; and
    an association between a second network address and a second tunnel identifier.

6. The apparatus of claim 1, wherein the instructions, when executed by the one or more processors, configure the apparatus to send the at least one indication by sending the at least one indication from a distinct network address other than the plurality of different network addresses.

7. The apparatus of claim 1, wherein the instructions, when executed by the one or more processors, configure the apparatus to send the plurality of signals by sending the plurality of signals via at least a first output address and a second output address.

8. A system comprising:
    a computing device and a receiving device;
    wherein the computing device comprises:
        one or more first processors; and
        memory storing first instructions that, when executed by the one or more first processors, configure the computing device to:
            send, to the receiving device, at least one indication associating a plurality of different network addresses with a plurality of data tunnels of different types, wherein the at least one indication is sent via a data tunnel different from the plurality of data tunnels;
            send, via the plurality of data tunnels of the different types and to the receiving device, a plurality of signals; and
            cause the receiving device to process the at least one indication before processing the plurality of signals; and
    wherein the receiving device comprises:
        one or more second processors; and
        memory storing second instructions that, when executed by the one or more second processors, configure the receiving device to:
            receive the at least one indication and the plurality of signals.

9. The system of claim 8, wherein the first instructions, when executed by the one or more first processors, configure the computing device to send the at least one indication by sending the at least one indication via a control data stream.

10. The system of claim 8, wherein the different tunnel types comprise two or more of:
    a broadcast tunnel type;
    a code download tunnel type;
    a conditional access tunnel type; or
    an application tunnel type.

11. The system of claim 8, wherein the first instructions, when executed by the one or more first processors, configure the computing device to send the plurality of signals by sending the plurality of signals via a plurality of output ports.

12. The system of claim 8, wherein the first instructions, when executed by the one or more first processors, configure the computing device to send the at least one indication by sending:
    an association between a first network address and a first tunnel identifier; and
    an association between a second network address and a second tunnel identifier.

13. The system of claim 8, wherein the first instructions, when executed by the one or more first processors, configure the computing device to send the at least one indication by sending the at least one indication from a distinct network address other than the plurality of different network addresses.

14. The system of claim 8, wherein the first instructions, when executed by the one or more first processors, configure the computing device to send the plurality of signals by sending the plurality of signals via at least a first output address and a second output address.

15. A non-transitory computer-readable medium storing instructions that, when executed, cause:
    sending, to a computing device, at least one indication associating a plurality of different network addresses with a plurality of data tunnels of different types, wherein the at least one indication is sent via a data tunnel different from the plurality of data tunnels;

sending, via the plurality of data tunnels of the different types and to the computing device, a plurality of signals; and causing the computing device to process the at least one indication before processing the plurality of signals.

16. The non-transitory computer-readable medium of claim 15, wherein the instructions, when executed, cause the sending the at least one indication by causing sending the at least one indication via a control data stream.

17. The non-transitory computer-readable medium of claim 15, wherein the different tunnel types comprise two or more of:

a broadcast tunnel type;
a code download tunnel type;
a conditional access tunnel type; or
an application tunnel type.

18. The non-transitory computer-readable medium of claim 15, wherein the instructions, when executed, cause the sending the plurality of signals via the plurality of data tunnels by causing sending the plurality of signals via a plurality of output ports.

19. The non-transitory computer-readable medium of claim 15, wherein the instructions, when executed, cause the sending the at least one indication by causing sending:

an association between a first network address and a first tunnel identifier; and
an association between a second network address and a second tunnel identifier.

20. The non-transitory computer-readable medium of claim 15, wherein the instructions, when executed, cause the sending the at least one indication by causing sending the at least one indication from a distinct network address other than the plurality of different network addresses.

21. The non-transitory computer-readable medium of claim 15, wherein the instructions, when executed, cause the sending the plurality of signals by causing sending the plurality of signals via at least a first output address and a second output address.

* * * * *

UNITED STATES PATENT AND TRADEMARK OFFICE
CERTIFICATE OF CORRECTION

| | |
|---|---|
| PATENT NO. | : 11,736,311 B2 |
| APPLICATION NO. | : 17/589489 |
| DATED | : August 22, 2023 |
| INVENTOR(S) | : Taylor et al. |

It is certified that error appears in the above-identified patent and that said Letters Patent is hereby corrected as shown below:

On the Title Page

In the References

Item (56) Other Publications: Page 2, Column 2, Line 1:
Delete "2,536, 177," and insert --2,536,177,--

In the Specification

Column 5, Line 5:
Delete "1542-162" and insert --154-162--

Signed and Sealed this
Eighth Day of October, 2024

Katherine Kelly Vidal
*Director of the United States Patent and Trademark Office*